May 17, 1938. W. W. GARSTANG Re. 20,728

VIBRATOR AND OPERATING CIRCUIT THEREFOR

Original Filed Nov. 9, 1934

INVENTOR.

William W. Garstang.

BY

Hood + Hahn.

ATTORNEYS.

Reissued May 17, 1938

Re. 20,728

UNITED STATES PATENT OFFICE 20,728

VIBRATOR AND OPERATING CIRCUIT THEREFOR

William W. Garstang, Indianapolis, Ind., assignor to Electronic Laboratories, Incorporated, Indianapolis, Ind., a corporation of Indiana Original No. 2,020,681, dated November 12, 1935, Serial No. 752,211, November 9, 1934. Application for reissue June 18, 1936, Serial No. 85,922

12 Claims. (Cl. 175—365)

My invention relates to voltage converters and particularly to that type of voltage converter for use as a power supply unit for radios and like use.

My invention also relates to improvements in vibrators for use in connection with said power converters. While my invention is primarily for use in radio work, there are various other uses to which the same is applied and it is particularly applicable for use for converting direct current into alternating current on voltages as high as 110 volts.

In the relatively high voltage converters, that is, converters for voltages as high as 110 volts, it is necessary that the vibrator, which is used in this kind of work, be actuated by the high voltage. In view of the fact that these vibrators are extremely small in size and the windings of the magnets thereof are characteristically small, it is difficult to produce a vibrator, of the electromagnetic type, in which the coil will handle the relatively high voltage without developing destructive heat.

Furthermore, in view of the fact that these vibrators have certain of their contacts mounted on a vibrating reed which vibrates at relatively high speed and is therefore subjected to rapid changes in tension, it is desirable and in fact, to obtain long life of the reed, necessary, that the swing of the reed or the vibration of the reed must be uniform and with a constant frequency.

Heretofore the actuating coils of such electromagnetic vibrators have been of the shunt type where they were connected across the source of potential and were of sufficient resistance to limit the amount of current flowing. The vibrating member was actuated by short-circuiting this coil to thus release the magnetic pull thereof or by opening and closing the circuit thereof. Such structures as these are satisfactory with low voltages, around six to thirty volts, but when it is desirable to operate the vibrator on higher voltages, such as 110 or 220 volts, these structures did not prove satisfactory. In order to retain sufficient resistance in the coil to prevent heating and to limit the current when this high voltage was applied it became necessary to wind the actuating coils with many turns of extremely small wire. As a result of the large number of turns considerable power was lost in the form of dissipated heat in the coils. Furthermore this heat became so great as to damage the coil and to affect the contact points of the vibrating circuit closure. Furthermore, due to the many turns of wire the inductance became very high and since it is essential that the coil charge and discharge in the same period with the vibrating member which has a natural frequency, this change of inductance caused fluctuations in the operations of the vibrator, resulting in excessive sparking and a dampened condition of the oscillation of the vibrating member. Furthermore, due to the fine wire used in the coils and the high resistance, any temperature rise in the coils would cause a rise in resistance and this proved detrimental because the amplitude of vibration of the vibrating member was large when the coil was cold and after continued operation of the device the resistance would change, thus decreasing the amplitude of the magnet by this same value.

Furthermore, in high power converters it has been found necessary to place a resistance or inductance in series with the source of power either incorporated in the transformer of the converter or external to the transformer to limit the instantaneous current when the contacts are first closed. Most converters of this type have a variable output adjusted by means of a tapped secondary winding of the transformer. As a result, as more power is delivered at the output side of the converter, more power is used on the primary side of the converter and this current would produce a greater voltage drop in the series resistance, thus a lower voltage would be applied to the actuating coil of the vibrator, again causing a decrease in amplitude of the vibrating member. Furthermore, in vibrators, under certain conditions it was necessary to provide a relatively stiff vibrating reed to insure against chattering. This meant that to initiate the vibration of the reed a relatively high-powered magnetic coil was necessary. The high-powered coil of course meant an increasing heat factor which was objectionable both from the standpoint of damaging the coil itself and also from the standpoint of damaging the vibrator.

By my present invention I am enabled to eliminate the above-mentioned difficulties. I have found that if a coil having fewer turns of larger wire is used and if an external resistance is placed in series with the coil, and if the coil is shunted with a capacitance of such a value as to produce a parallel circuit which will resonate at the natural frequency of the vibrating arm, that the heat loss will be reduced materially and that the vibrating member will have a stable and constant oscillation. Furthermore, I have also found that by increasing the value of the resistance after initiating the vibration of the vibrating reed advantageous results may be obtained. This increased value in the resistance may be obtained in various ways as for instance, by providing a resistance which in itself inherently increases in value by the passage of current therethrough or by providing a relay which automatically, under predetermined conditions, will cut in additional resistance in the circuit.

For the purpose of disclosing my invention I have illustrated certain embodiments thereof in the accompanying drawing, in which Fig. 1 is a side elevation of a vibrator which may be used in connection with my invention;

Figure 1:
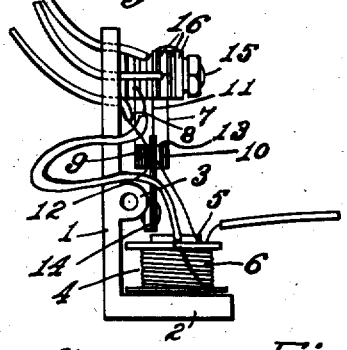
Figure 2:
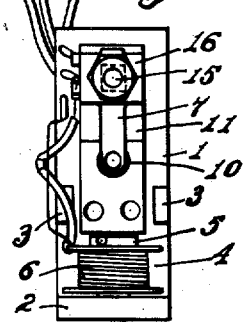
Fig. 2 is a plan view thereof.

In the embodiment of the invention I provide a vibrator of the electromagnetic type in which there is provided a base, preferably L-shaped, the leg 1 of this base being considerably longer than the leg 2 which extends at right angles thereto, and this base is formed of iron to provide a frame for the structure. A pair of ears 3 extend forwardly from each edge of the base. Mounted on this base is an electromagnet 4 comprising a core 5 secured to the base and in direct contact therewith and surrounded by a coil 6 of suitable wire. The circuit-controlling contacts of the vibrator are mounted at the opposite end of the leg 1 and comprise the spring contact-carrying fingers 7 and 8, each of which carries a contact 9 and 10. Arranged between these contact fingers is a vibrating reed 11 carrying on its opposite face contacts 12 and 13 adapted to contact respectively with the contacts 9 and 10 and provided at its end with an armature 14 which lies in proximity to but not in contact with one end of the core 5, and it will be noted also that this armature lies between the two ears 3. The fingers and reeds are secured on the leg 1 of the frame by a suitable screw 15 and are separated by suitable spacer members or washers 16 some of which are of insulating material for the purpose of insulating the contact-carrying fingers from the vibrating reed. Furthermore, in order to insure absolute insulation between the parts the screw is surrounded by a porcelain tube or insulator. By the particular construction of the frame and by forming the frame of iron I am enabled to provide a better magnetic path for the lines of force whereby a greater effect is produced upon the armature with a fewer number of ampere turns.

Figure 3:
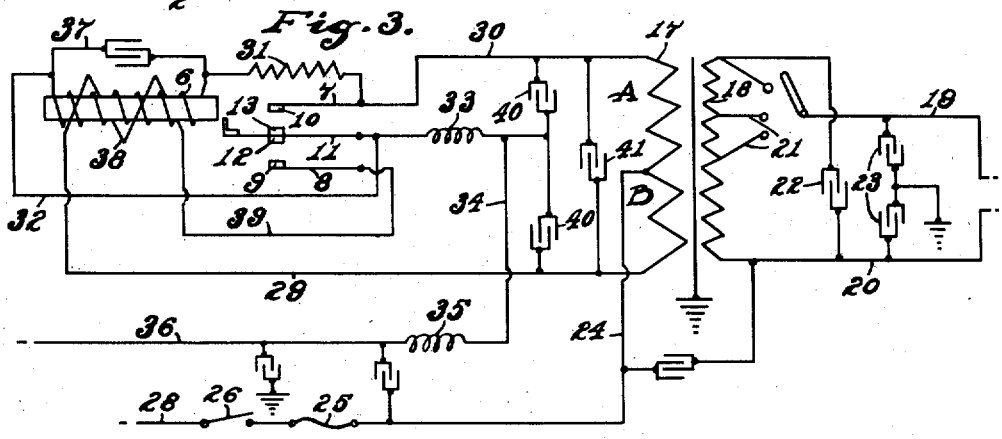
Fig. 3 is a diagrammatic view of a converter circuit embodying my invention.

Referring now to Fig. 3, I have provided a transformer comprising the primary 17 and a secondary 18. This secondary has its opposite ends connected by conductors 19 and 20 with the delivery side of a converter and in order that the output may be varied, I provide a series of taps 21 from the winding of the secondary by which the delivery side 19 may be connected at different points to the secondary. I also provide suitable condensers such as 22 across the conductors 19, and 20 and 23 which may be in series and are grounded.

At an intermediate point between its terminals the primary 17 is connected by a conductor 24 through a fuse 25 and a switch 26, with one side 28 of a D. C. supply line. One of the outside terminals of the primary winding is connected by conductor 30 through the resistance 31 with the energizing winding 6 of the vibrator, the opposite terminal of this winding being connected by conductor 32 with the center vibrating reed 11 carrying the contacts 12 and 13. This reed in turn is connected through a choke coil 33 and by conductor 34 through an additional choke coil 35 with the opposite side 36 of the line. A suitable condenser circuit 37 is provided around the winding 6. The opposite terminal of the primary winding is connected by conductor 29 through a winding 38 which may be wound on top of the winding 6 and by conductor 39 with the contact 9. The conductors 30 and 29 have connected between the same suitable condensers 40 and 41.

In operation, assuming that the switch 26 is closed, circuit will first be established through one-half of the primary, the half A, by the way of the conductor 24, the half A of the primary, conductor 30, resistance 31, winding 6, and by conductors 32 and 34 back to the opposite side of the line. It will be noted that the circuit is established in one direction through this half. It will be noted that the resistance 31 electrically isolates the resonant circuit consisting of the condenser 37 and the coil 6 from the other parts of the circuit such, for instance, as shown in Fig. 3, from the effect of the condensers 40 or 41 or from the effect of the primary winding of the transformer. The resistance 31, therefore, comprises an isolating resistance.

This, of course, will energize the magnet, causing it to attract its armature, short-circuiting the winding 6 through the contacts 10 and 13, whereby the magnet will be deenergized and, through the resiliency of the vibrating reed, the reed will open the circuit through the half A of the primary, but will immediately engage contacts 12 and 9, establishing a circuit through the half B of the primary, in the opposite direction, from the side 28 of the line through conductor 24, the half B, the conductor 29, the resistance winding 38, conductors 39 and 34 back to the opposite side 13 of the winding. The continued vibration of the reed will alternately reverse the flow of current, as above described, through the primary and thus establish in the well-known manner, an alternating current in the secondary of the transformer, which alternating current may be delivered from the secondary through the conductors 19 and 20, and which may be varied by taking it off from the different taps on the secondary.

Figure 4:
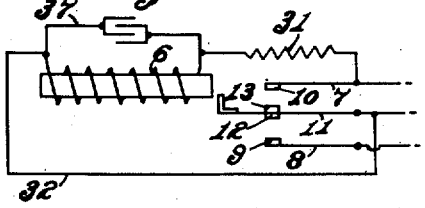
Fig. 4 is a diagrammatic view of a modified form of vibrator circuit embodying my invention.
Figure 6:
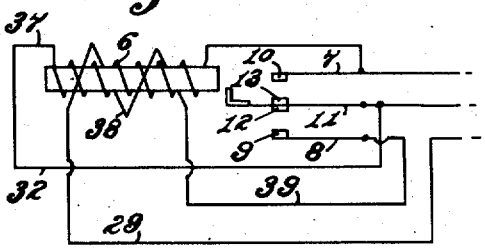
Fig. 6 is a diagrammatic view of a still further modification of my invention.

In the structure illustrated in Fig. 4 it will be noted that I have dispensed with the winding 38, while in the structure illustrated in Fig. 6 it will be noted that I have dispensed with the resistance 31, maintaining the winding 38.

Figure 5:
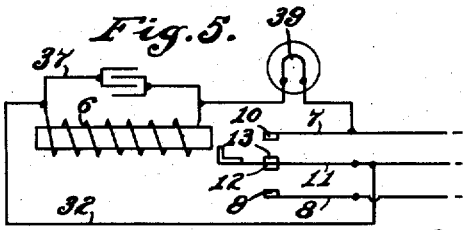
Fig. 5 is a diagrammatic view of a further modification.

In Fig. 5, I have shown a modification wherein the resistance 31 is of the type which increases in value as the current passes therethrough. This may be in the form of an incandescent lamp 39 or of some other type of similar resistance.

Figure 7:
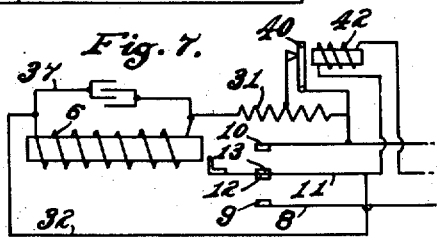
Fig. 7 is a diagrammatic view of a further modification of my invention.

In Fig. 7, I have illustrated a further modification wherein instead of a lamp as at 39, I have provided a relay switch 40 normally short-circuiting a portion of the resistance 31. An electromagnet 42 for operating this switch has its windings connected in series with the vibrating reed 11 so that as soon as this electromagnet becomes energized the movable contact of the relay 40 will be moved out of engagement with the stationary contact, thereby opening the short circuit of a portion of the resistance and placing the full value of the resistance in circuit.

In operation, when current is being delivered from the transformer of the converter, there will be a resultant drop in the voltage applied to coil 6. This of course will result in a decrease in the ampere turns of the coil 6 and as a result the pull of the coil will be decreased. This of course will modify its effect on the reed 11 so that the amplitude of the vibrations will accordingly decrease. In order to offset this decrease in ampere turns of the coil 6, I provide the coil 38 which is in series with the half B of the primary and, as a result, as the current is consumed in the primary, a greater current will be passed through the coil 38, thereby increasing the ampere turns of the coil 38 and thus counterbalancing the decrease in the ampere turns in the coil 6 whereby the effective pull of the magnet is maintained constant.

In order that the number of turns of the coil 6 may be reduced and at the same time prevent the coil 6 from being damaged by its own dissipated heat, I provide the resistance 31 which dissipates a large proportion of the heat which otherwise would be developed in the coil 6. In order to prevent the resistance 31 from having a dampening action on the coil 6, I provide the condenser 37 connected as heretofore described.

In some instances, as where the vibrating reed may be made necessarily stiff for the prevention of chattering or for other reasons, it is desired to provide an increased magnetic effect in the coil 6 initially, which, after the reed starts to vibrate, may be decreased as I have found that after the reed has once started in its movement the magnetic pull of the coil need not necessarily be as great. To accomplish this result I provide, as is illustrated in Fig. 5, a resistance which automatically increases as the current passes therethrough in the form of the lamp. In this instance, when the current is initially passed through the resistance, due to the low resistance, increased current is passed through the coil 6. As soon however as the lamp becomes heated its resistance is materially increased, thereby cutting down the current passing through the coil.

In Fig. 7, instead of providing a lamp I provide a relay which normally short circuits a portion of the resistance and which, as soon as current passes through the reed 11 and through the coil 6, is open.

I claim as my invention:

1. In a vibrator, the combination with a vibrating reed, of an electromagnet for operating the reed having its energizing circuit controlled by said reed, an isolating resistance in series with the coil of said magnet and a condenser in parallel with said coil having a capacity to produce a resonance therein at the natural frequency of said reed.

2. In a vibrator, the combination with a vibrating reed, of an electromagnet for operating the reed having its energizing circuit controlled by said reed, a resistance in series with the coil of said magnet automatically increased by the passage of current therethrough and a condenser in parallel with said coil.

3. In a device of the character described, the combination with a transformer having one coil thereof connected intermediate of its ends with one side of a source of power, of a pair of contacts respectively connected to the opposite ends of said coil, a vibrating reed connected to the opposite side of said source of power normally out of contact engagement with one of said contacts and adapted by its vibration to alternately engage said first-mentioned contacts, an electromagnet for vibrating said reed, an isolating resistance in series with the coil of said magnet and a condenser in parallel with said coil having a capacity to produce in said circuit a resonance at the natural frequency of said reed.

4. In a device of the character described, the combination with a transformer having one coil thereof connected intermediate of its ends with one side of a source of power, of a pair of contacts respectively connected to the opposite ends of said coil, a vibrating reed connected to the opposite side of said source of power, normally out of contact engagement with one of said contacts and adapted by its vibration to alternately engage said first-mentioned contacts, an electromagnet for vibrating said reed, means whereby said electromagnet circuit will be short circuited by the vibration of the reed in one direction, an isolating resistance in series with the coil of said magnet and a condenser in parallel with said coil having a capacity to produce a resonance in said circuit at the natural frequency of said reed.

5. In a vibrator, the combination with a vibrating reed, of a circuit controlled by said reed, an electromagnet for vibrating said reed having a voltage coil subject to voltage changes in the circuit controlled by said reed and a current coil subject to current changes in the circuit controlled by said vibrating reed.

6. The combination with a vibrating reed, of a circuit controlled thereby, an electromagnet for operating said reed having a voltage coil subject to voltage changes in the circuit controlled by said reed, and a current coil inversely subject to current changes in the circuit controlled by said reed.

7. The combination with a vibrating reed, of a circuit controlled thereby, an electromagnet for operating said reed having a voltage coil subject to voltage changes in the circuit controlled by said reed, and a current coil subject to current changes in the circuit controlled by said reed, a resistance in series with the voltage coil and a condenser in parallel with said voltage coil.

8. The combination with a vibrating reed, of a circuit controlled thereby, an electromagnet for operating said reed, having a voltage coil subject to voltage changes in the circuit controlled by said reed, and a current coil subject to current changes in the circuit controlled by said reed, a resistance in series with the voltage coil automatically increased by the passage of current through said resistance and a condenser in parallel with said voltage coil.

9. In a device of the character described, the combination with a transformer having one coil thereof connected intermediate of its ends with one side of a source of power, of a pair of contacts respectively connected to the opposite ends of said coil, a vibrating reed connected to the opposite side of said source of power, an electromagnet for vibrating said reed having a voltage coil subject to voltage changes in said transformer coil and a circuit coil subject to current changes in said transformer coil.

10. In a device of the character described, the combination of a transformer having one coil thereof connected intermediate of its end with one side of a source of power, of a pair of contacts respectively connected to the opposite ends of said coil, a vibrating reed connected to the opposite side of said source of power for engagement with said contacts, an electromagnet for vibrating said reed having a voltage coil subject to voltage changes in said transformer coil and a current coil subject to current changes in the transformer coil, a resistance in series with the voltage coil of said magnet and a condenser in parallel with said coil.

11. In a device of the character described, the combination with a transformer having one coil thereof connected intermediate of its end with one side of a source of power, of a pair of contacts respectively connected to the opposite ends of said coil, a vibrating reed connected to the opposite side of said source of power and adapted in its vibration to alternately engage said contacts, an electromagnet for vibrating said reed having a voltage coil subject to voltage changes in said transformer coil, and a current coil inversely subject to current changes in said transformer coil, a resistance in series with said voltage coil automatically increased by the passage of current through said coil, and a condenser in parallel with said voltage coil.

12. In a device of the character described, the combination with a transformer having one coil thereof connected intermediate of its ends with one side of a source of power, of a pair of contacts respectively connected to the opposite ends of said coil, a vibrating reed connected to the opposite side of said source of power normally out of contact engagement with one of said contacts and adapted in its vibration to alternately engage said first-mentioned contacts, an electromagnet for vibrating said reed and having a voltage coil subject to voltage changes in said transformer coil, and a current coil inversely subject to current changes in the transformer coil, a resistance in series with said voltage coil automatically increased by the passage of current through said voltage coil, a condenser in parallel with said voltage coil and means whereby said electromagnet circuit will be short-circuited by the vibration of the reed in one direction.

WILLIAM W. GARSTANG.